United States Patent [19]

Kortenhaus

[11] 3,739,342

[45] June 12, 1973

[54] SELECTIVE RETRIEVAL AND MEMORY SYSTEM

[75] Inventor: Dieter Kortenhaus, Bingen, Germany

[73] Assignee: NSM Apparatebau GmbH, Bingen/Rhine, Germany

[22] Filed: May 26, 1971

[21] Appl. No.: 147,082

[30] Foreign Application Priority Data

Jan. 22, 1971 Germany .................. P 21 03 029.5

[52] U.S. Cl. .......................... 340/162, 340/174.1 J

[51] Int. Cl. .......................... G11b 5/00, H04q 9/00

[58] Field of Search .................... 340/162, 174.1 K, 340/174.1 J; 194/15

[56] References Cited

UNITED STATES PATENTS

| | | | |
|---|---|---|---|
| 3,511,351 | 5/1970 | Jones | 340/162 X |
| 3,555,509 | 1/1971 | Arsem | 340/162 |

*Primary Examiner*—Donald J. Yusko

*Attorney*—Fitch, Even, Tabin & Luedeka

[57] ABSTRACT

A system for selectively retrieving one of a plurality of articles, such as record disks in an automatic phonograph, has logic gates, a memory and related functional components readily suited for metal-oxide-semiconductor construction.

14 Claims, 2 Drawing Figures

Figure 1:
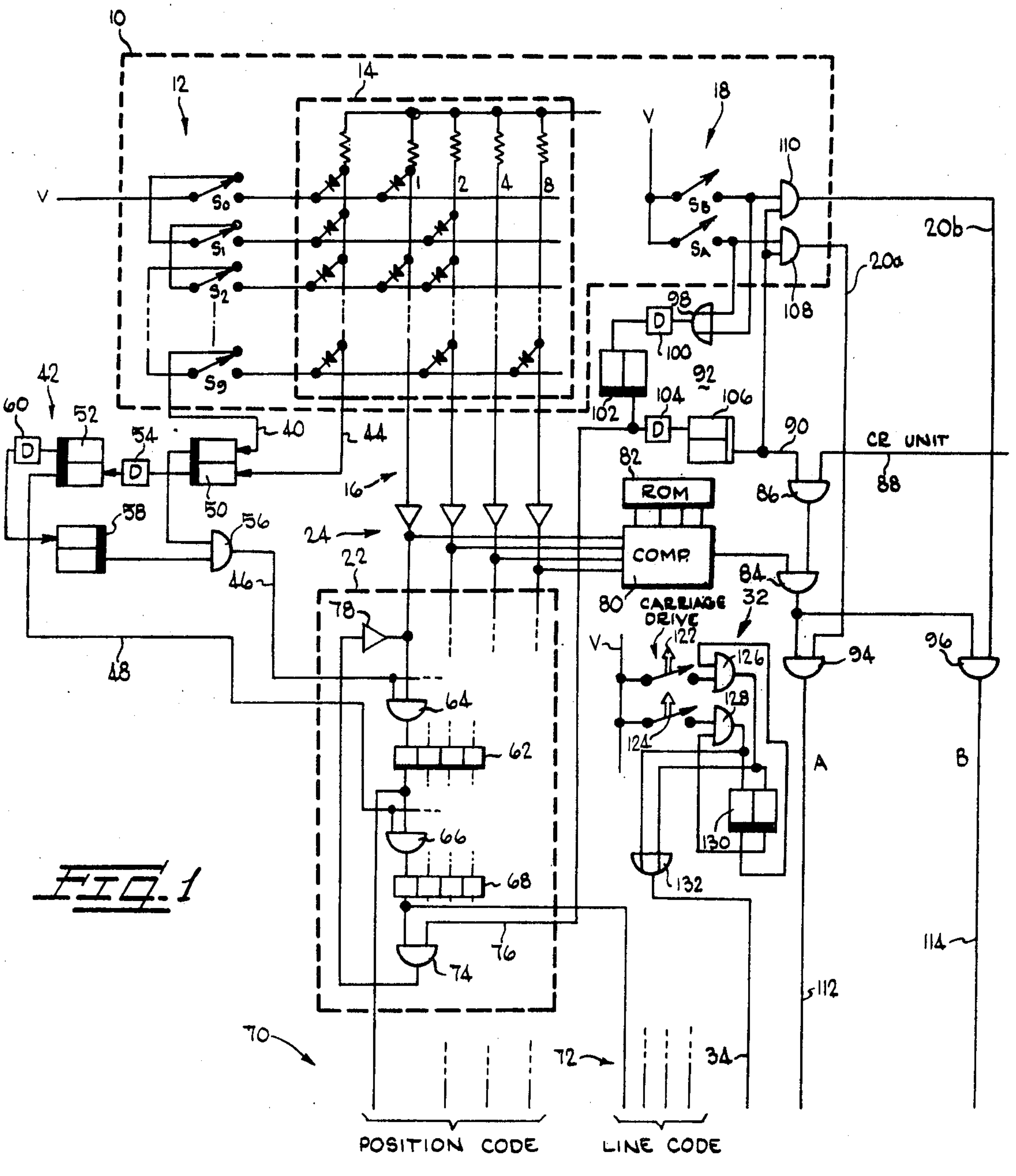

INVENTOR
DIETER KORTENHAUS

Tilch, Even, Tabin & Flynn
ATTYS

INVENTOR
DIETER KORTENHAUS

Fitch, Even, Tabin, & Luedeka
ATTYS.

SELECTIVE RETRIEVAL AND MEMORY SYSTEM

The present invention relates to a system for selectively retrieving one or more of a plurality of articles, each being stored in respective predetermined storage locations, and more particularly to a selection and memory system for an automatic phonograph or the like for selecting and storing the selection information corresponding to each record side to be played.

Although the present invention may be adapted for use with various types of article retrieval systems, it is herein illustrated and described for use in conjunction with an automatic phonograph, such as a coin-actuated juke box typically having a number of individually playable record disks in a magazine and a carriage mounted for movement relative to the record magazine. The carriage commonly comprises means for removing an individual record from the magazine, clamping the record to a turntable, playing the record, and returning the record to the magazine. Record selecting means are typically employed to enable the operator to select sides of particular records, and a memory unit is provided to store the record side selections.

Heretofore, such automatic phonographs have generally included selection and memory systems of a fundamentally mechanical or electromechanical nature, and such systems have in the past employed electromagnetic relays and magnetic cores for providing selection memory functions. These systems have generally required a relatively large number of costly and specially constructed components.

Other control systems for automatic phonographs have also been proposed which utilize essentially solid state electronic elements such as diodes, transistors and integrated circuits to provide faster operation and more economical construction costs. However, such solid state systems as have been heretofore proposed are of relatively great complexity and employ a large number of such solid state components.

Accordingly, it is an object of the present invention to provide an improved system for selectively retrieving one or more of a plurality of articles, such as records in an automatic phonograph, by employing solid state components in relatively uncomplicated circuits which may be economically manufactured.

It is another object of the invention to provide such an improved system which may be adapted to be readily formed from metal-oxide-semiconductor (MOS) elements.

It is a further object of the invention to provide a selection and selection memory system for coin operated automatic phonographs which is particularly adapted for metal-oxide-semiconductor techniques of construction, while providing the necessary functions and operations for such automatic phonographs at an especially low cost as compared to that which would otherwise be needed to perform the same functions with other techniques of implementation.

Figure 2:
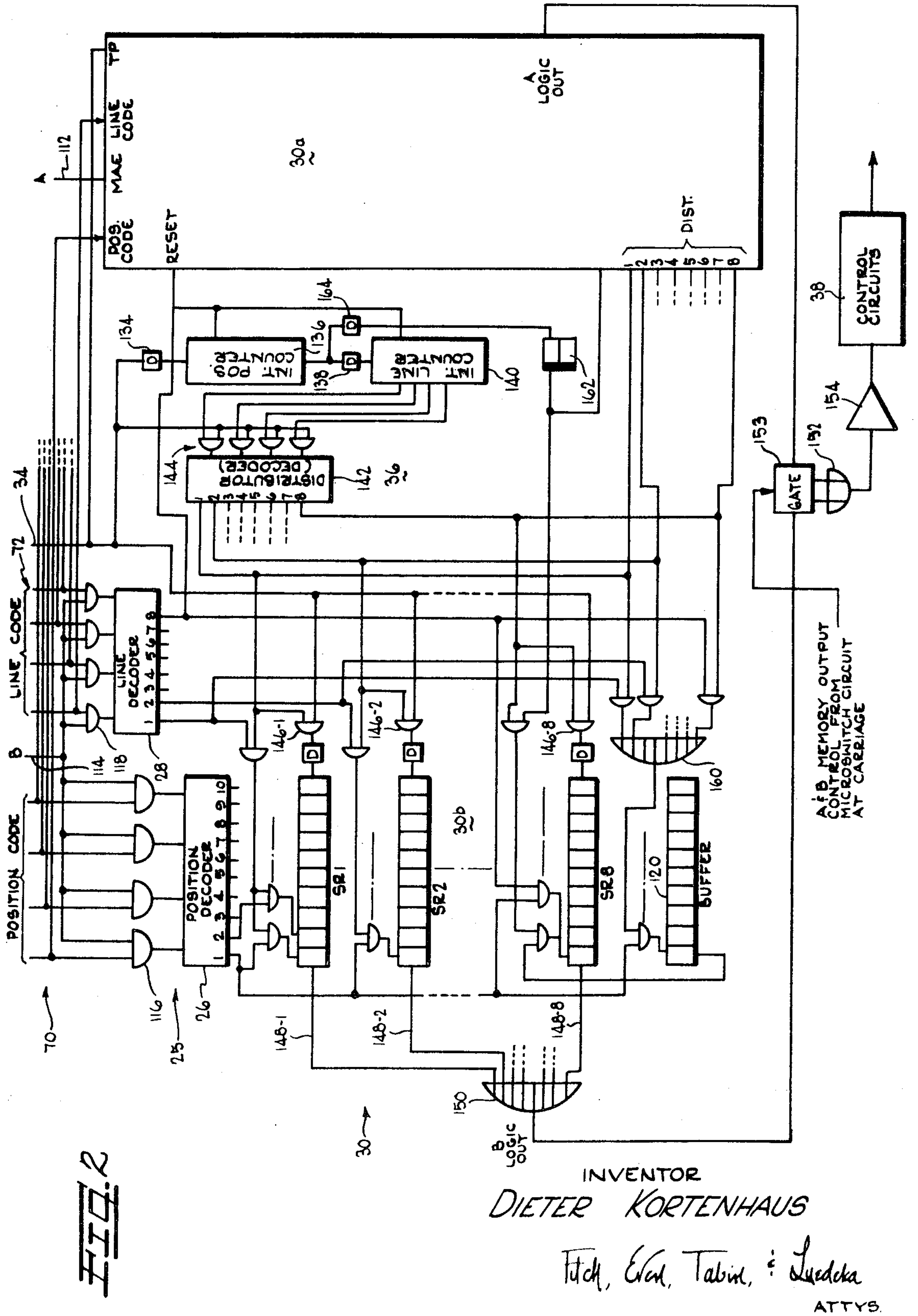

These and other objects of the invention are more particularly set forth in the following detailed description and in the accompanying drawings of which:

FIG. 1 is a schematic diagram showing a portion of the system in accordance with an embodiment of the invention; and FIG. 2 is a schematic diagram showing a further portion of the system in accordance with the present embodiment of the invention.

Briefly, referring to FIGS. 1 and 2, there is shown a selection and memory system for selecting and storing the selection information for each record to be played by an automatic phonograph or the like of the type having each record stored in a different predetermined storage location and a record playing means which is sequentially positionable in relative accessing and playing relation to the predetermined storage locations to play the records which have been selected.

The system, in general, comprises information input means 10, illustrated as having a first set of selection switches 12 and a convertor 14, for providing a selectable encoded signal on leads 16 correspnding to and being indicative of a selected given record in a certain storage location within a record storage magazine. The information input means 10 also has means, illustrated as a second set of selection switches 18, for providing a further signal on leads **20*a* and 20*b*** indicative of the selection of a predetermined portion of the selected record, such as the particular record side of the disk to be played.

A buffer storage means 22 is responsive to the encoded signals on leads 16 from the convertor 14 through amplifiers 24 and stores each encoded selection signal until it is properly gated into a record storage address memory 30 (FIG. 2). The buffer storage 22 also provides a selection error cancellation feature which will be hereinafter described.

Logic and gating means 25, illustrated in FIG. 2 as position and line decoders 26 and 28 and their associated circuitry, is responsive to the encoded selection signal in the buffer storage 22 for writing a retrieval command signal into the memory 30 at an address corresponding to and defined by the encoded selection signal. The memory 30 comprises two sets of storage addresses or sub-memories **30*a* and 30*b*, and the storage addresses of each sub-memory correspond to the respective predetermined storage locations of the records. Each set or submemory is associated with only one side of the records, and the two sub-memories are identical in the illustrated embodiment of the invention. As such, only sub-memory 30*b* is shown in detail, sub-memory 30*a* being shown merely in block form. The second set of selection switches 18, $S_A$ and $S_B$, through suitable logic gates determine which of the two sub-memories 30*a* or 30*b*, associated with each of the two record sides, will store the retrieval command signal at the storage address corresponding to the encoded signal in buffer storage 22**.

Timing means 32 (FIG. 1) provides a synchronous timing signal on lead 34 as the record playing means is positioned into accessing relation with each record storage location in sequence, and interrogating means 36 (FIG. 2) is responsive to the timing signal on lead 34 for synchronously interrogating the storage addresses of the memory 30 in a sequence corresponding to the sequential access positioning of the record playing means relative to the storage locations of the records.

Control means, illustrated as the control circuits 38 in FIG. 2, is responsive through appropriate logic to the output of the memory 30, as the addresses thereof are sequentially interrogated, to thereby cause the record playing means to retrieve the given selected record upon the occurrence of the aforementioned retrieval command signal at the output of the memory. The construction of the record playing means may be of any conventional type, such as that having a reciprocating carriage movement relative to the record storage magazine and having a well known cyclical retrieval, play, and return operation. Each cyclical operation of the record playing means commences upon actuation of the signal from the present system, but follows through automtically by well known means not forming any part of the present invention. With playing means having such a reciprocable carriage, each sub-memory 30*a*, 30*b* is interrogated during only one direction of motion of the carriage, so that all of the storage addresses of sub-memory 30*a* are interrogated as the carriage moves in one direction for playing only the *a* side of the records and all of the storage addresses of sub-memory 30b are interrogated as the carriage moves in the other direction for playing only the *b* side of the records.

More particularly, referring to FIG. 1, the first set of selection switches 12 comprises, for example, 10 double-throw switches $S_0$ through $S_9$ which may be in the form of momentary action pushbuttons normally biased in their outer or upper position. The upper and normally closed contact of each switch is conductively connected to the movable contact of the next successive switch. A voltage V is applied to the movable contact of switch $S_0$ which in its normal position thus completes a circuit common to every other switch $S_1$ through $S_9$ in series and terminates in output lead 40 which provides a reset signal to an input gating pulse generator circuit, illustrated generally as 42, which is employed to control the operation of the buffer storage 22, as will be hereinafter described.

The lower and normally open terminal of each switch $S_0$ through $S_9$ is respectively connected to the decimal input of the converter 14 which provides a keying pulse on lead 44 each time any of the switches 12 are depressed and a binary encoded output signal in parallel form on the four output leads 16, the binary encoding corresponding to the particular decimal number of the switch key being depressed. For a 10 switch keyboard, as ilustrated, 4 binary bits are sufficient to represent any of the keys $S_0$ through $S_9$, and two digits are used for selection of a given record. A complete selection of a given record and side is then made by depressing two switches on keyboard 12 (or the same switch twice) and one of the two switches on keyboard 18. The illustrated system handles 80 records or 160 record sides, but it is understood that the system may be readily designed to handle any number of records as desired. The binary encoded signals corresponding to a selected record could alternatively be provided by the use of conventional matrix keyboards, such as those typically employing combinations of numbers and letters to uniquely define a particular record storage location.

The input gating pulse generator 42 produces an input control pulse on lead 46 and a transfer pulse on lead 48 in response to every switch actuation on keyboard 12, both of which are fed to control terminals of the buffer storage 22 to control its operation and to avoid any errors that might otherwise be due to contact bounce. The input control pulse on lead 46 gates the encoded signal of the first selection code digit on output leads 16 of the convertor 14 to a first register of the buffer storage 22 and the transfer signal on lead 48 effects a transfer of the encoded information from the first register to a second register within the buffer storage 22 to permit a second encoded signal corresponding to the second digit of the selection code to be registered in the first register. Consequently, errors in selection can be corrected by the operator by merely repeating the correct selection code on the keyboard.

More specifically, the input gating pulse generator 42 comprises a bistable multivibrator or flip-flop 50 having the keying lead 44 from the convertor 14 coupled to its set input and the reset lead 40 from the switches $S_0$–$S_9$ coupled to its reset input. The principal output of the flip-flop 50 is coupled to the set input of a monostable multivibrator or one-shot 52 through a differentiator 54, and the complementary output of the flip-flop 50 is coupled to one input of AND gate 56. The principal output of the one-shot 52 is coupled to lead 48 and provides the transfer pulse to the buffer storage 22. The complementary output of one-shot 52 is connected to a further one-shot 58 through a differentiator 60, and the principal output of the one-shot 58 is coupled to a second input of the AND gate 56. The output of AND gate 56 is coupled to lead 46 and provides the aforementioned input control pulse to the buffer storage 22.

Consequently, upon the depression or actuation of any of the switches $S_0$ through $S_9$ of the keyboard 12 a set voltage is applied to the flip-flop 50 causing a potential change at the principal output thereof which results in a pulse being produced by the differentiator 54 to trigger the one-shot 52. The complementary output from the one-shot 52 is used to trigger the second one-shot 58 and the output therefrom is supplied to the AND gate 56 after a predetermined time delay fixed by the time constants of the one-shots. The potential applied to the other input of AND gate 56 from flip-flop 50 enables the output of the AND gate to produce a single, clean or "bounceless" pulse corresponding to the initial actuation of any of the input switches of the keyboard 12. Likewise, the transfer pulse on lead 48 is a clean pulse having the appropriate delay determined by the time constant of the one-shot 52 to cause the transfer at the proper time in the operation of the system. Upon release of the depressed switch, the reset circuit of lead 40 is completed and the application of the voltage V causes the flip-flop 50 to reset to its initial or original condition in preparation for another switch actuation on keyboard 12.

Turning to the buffer storage 22, this storage comprises two static 4 bit registers, 62 and 68, for storing each two digit selection code in the form of parallel encoded binary signals supplied from the respective outputs of amplifiers 24. For clarity of illustration, only the circuitry associated with the first binary bit of each register is shown; however, it is understood that essentially the same circuitry is associated with each of the three other bits of the registers indicated merely by dotted line.

The first register 62 of the buffer storage 22 is shown as a four-stage static memory having four inputs coupled to respective AND gates 64 (of which only one is shown for clarity) and each respective AND gate has two inputs, one input from each of the amplifiers 24 corresponding to each bit of the binary encoded digit selection signal and the other input being the input control gating pulse on lead 46. The respective outputs from each memory stage of the register 62 are coupled to second respective AND gates 66 (again, of which only one is shown for clarity) having their outputs coupled to the input of the second register 68 of the buffer storage 22. The other input to the AND gates 66 is provided by the transfer gating pulse on lead 48. Thus, each digit of the selection code actuated on the keyboard 12 is first placed in the first four-bit register 62 upon the occurrence of the input control gating pulse on lead 46, and then on the next successive digit selection from the keyboard 12 the contents of register 62 is transferred to the second register 68 upon the occurrence of the transfer gating pulse on lead 48. The second digit information is thus stored in the first register 62 and the first digit information is stored in the second register 68. The buffer storage 22 then contains the selection code information corresponding to the selected record storage location within the record magazine.

The selection code information from the buffer storage 22 provides an address information signal to the record storage address memory 30 for writing the retrieval command signal into the proper address of the memory 30. The address information signal is provided in the form of a position code signal corresponding to the output of the first register 62 and a line code signal corresponding to the output of the second register 68. The line and position code signals uniquely identify and define a particular record storage address within either the sub-memory 30*a* or 30*b*, depending on the record side selection made through switches $S_A$ and $S_B$. In the illustrated system, the first digit of the selection code made on keyboard 12 defines the particular line of the memory and the second digit defines the particular position within that memory, to provide the complete address for a record storage location. The four buffer storage output leads 70 from the four-bit register 62 supply the position code information for the memory, and the four other output leads 72 from the memory register 68 supply the line code information for the memory.

Referring again to the buffer storage 22, a further set of AND gates 74 are provided having one input coupled to each of the outputs of the register 68 and the other input commonly coupled to lead 76 which supplies a gating pulse at a predetermined time after either side selection switch $S_A$ or $S_B$ is actuated. The outputs from the AND gate 74 are fed back to their respective input leads corresponding to their binary bit position via suitable amplifiers 78. The outputs from the respective amplifiers 78 are then fed to the input of a comparator circuit 80 which has a further input from a read-only memory 82. The read-only memory 82 supplies the information to the comparator 80 identifying only the predetermined record storage locations which are allowed (or not allowed) to be played by the system when the proper credit units are present. Upon comparison of the binary four-bit input signal to the comparator with the signals provided by the read-only memory, the comparator 80 supplies, for example, a true or "1" output signal to comparator AND gate 84 if the record selection is a permitted one. The comparator AND gate 84 receives a second input from a credit AND gate 86 which also has two inputs, namely, one input from conventional credit circuitry (not shown) on lead 88, the presence of which indicates that sufficient money has been deposited in the coin slot, and the other input on lead 90 from a side selection pulse generator circuit 92 which presents a delayed, clean pulse on the actuation of either of the switches $S_A$ or $S_B$. Consequently, the comparator gate 84 supplies a true or 1 output a delayed time after a side selection switch on the keyboard 18 is actuated, if there is sufficient credit to cover the play, and the selection is a permitted selection as defined by the read-only memory 82.

The output of the comparator AND gate 84 provides an enabling gating signal to A and B record side AND gates 94 and 96. The other inputs to each of the record side AND gates 94 and 96 are supplied respectively from switches $S_A$ and $S_B$ through the pulse generator 92 to provide clean or bounceless pulses on leads 20*a* and 20*b*.

The pulse generator 92 takes an input from the voltage supply V through either switch $S_A$ or $S_B$ to an OR gate 98 the output of which is formed as a pulse by differentiator 100 and supplied to the input of a one-shot 102. The output of the one-shot 102 generates the delayed gating pulse on lead 76 to the last AND gates 74 of the buffer storage 22 and is also formed into a pulse by differentiator 104 and then used to trigger a further one-shot 106 which adds a further delay and provides an enabling voltage to a pair of AND gates 108 and 110 to permit the actuated switch pulses from the switches 18 to be gated to the side selection AND gates 94 and 96 via leads 20*a* and 20*b*. Thus, with all of the system conditions satisfied, an appropriate logic signal will be developed on either leads 112 or 114 depending on which selection switch $S_A$ or $S_B$ is actuated, and the logic signals on these leads will determine into which sub-memory 30*a* or 30*b* the retrieval command signal will be written. The address of the command signal will, as aforementioned, be determined by the line and position code signals from buffer storage 22.

Referring now to FIG. 2, the position code and line code information is fed to the gating means 34 for writing the retrieval command signal into either memory 30*a* or 30*b* at the storage address corresponding to the position and line codes. More particularly, the position codes from leads 70 are supplied in parallel binary form to the position decoder 26 via respective AND gates 116. Likewise, the line code information is supplied in parallel binary form to the line decoder 28 via respective AND gates 118. For present purposes it is assumed that the switch $S_B$ was actuated, and all of the other system conditions were satisfied, then the B record side gating signal on lead 114 effects the gating function of AND gates 116 and 118, and effectively selects the storage addresses of sub-memory 30*b*. Likewise, an A record side gating signal on lead 112 would gate the position and line code information of the sub-memory 30*a* through similar gating means and decoder circuitry. Thus, in the illustrated embodiment, the position and line code information is fed in parallel into both sub-memories 30*a* and 30*b*, and the particular memory employed is determined by the record side gating signal.

As such, the sub-memories 30*a* and 30*b* are preferably of identical construction and have the same storage addresses corresponding to the respective predetermined record storage locations. The position decoder 26 and the line decoder 28 convert the parallel binary input signals to separate decimal indications and by means of suitable gating circuits write the retrieval command signal, such as a logical 1, into the appropriate address of the appropriate sub-memory, such as 30*b* in the present illustration.

Each of the sub-memories in the illustrated embodiment comprise eight lines of 10-stage shift registers SR1 through SR8 and a 10-stage buffer shift register 120. Thus, in the illustrated embodiment, 80 storage addresses are provided corresponding to 80 record positions in the automatic phonograph, although any other number may be employed. The shift register memories are particularly well suited for metal-oxide-semiconductor manufacturing techniques, as compared to static or flip-flop types of memories. As previously mentioned, the output of the line decoder 28 corresponds to the digit of the first key selected on the keyboard 12 and the output of the position decoder 26 corresponds to the digit of the second key selected on the keyboard 12. The outputs of both decoders 26 and 28 are matrixed through appropriate AND gates as shown to insert a command signal, such as a logical 1 if each stage is normally 0, into the appropriate stage, as determined by the position decoder 26, of the appropriate shift register line, as determined by the line decoder 28.

In this manner, the selections which are made by the switches on keyboards 12 and 18 are stored in the appropriate sub-memory and at the appropriate storage address therewithin. The insertion or writing in of the command signal for the appropriate selection or selections is made independently of the action of the record retrieval and playing mechanism.

With respect to reading out the retrieval command information from the memory 30, reference is now made back to FIG. 1. The timing means 32 provides a timing signal on lead 34 in synchronism with the record retrieval and playing means carriage being positioned in accessing relation to each record storage location and comprises a pulse generator having a pair of switches 122 and 124 which are cyclicly actuated by the rotation of the carriage drive wheel to provide voltage pulses from a source V to the AND gates 126 and 128. The switches provide signal pulses corresponding in time to the positioning of the record retrieving and playing mechanism in playing relation to each record; however, in the illustrated system, each switch, 122 and 124, is actuated on every other, i.e. alternate, record postion. A flip-flop 130 and an OR gate 132 are connected as shown to provide clean or bounceless timing pulses on output lead 34.

As shown in FIG. 2, the interrogating means 36 is responsive to these timing pulses on lead 34 after being differentiated by differentiator 134 to trigger internal position counter 136. The output of the counter 136 is fed through a further differentiator 138 to provide triggering pulses to an internal line counter 140. The line counter 140 provides a four bit binary output in parallel form to a decoder 142 through respective AND gates 144. The AND gates are controlled, in turn, by the timing signal from lead 34 to obtain proper timing.

The decoder 142 functions as a distributor having an output signal which sequentially moves from output line 1 through output line 8, and the duration of the signal on each output line equals the time that the playing means carriage takes to move through the record storage positions of the magazine associated with the ten addresses of each shift register line in the memory. Shift drive AND gates 146–1, 146–2, etc., are each responsive to the respective sequential outputs of the decoder 142 at one input and are responsive to the timing signal from lead 34 at their other input. The output of each shift drive AND gate 146–1, 146–2, etc. is coupled through a differentiator as shown to the driving input of its respective shift register, SR1, SR2, etc.

Consequently, as the carriage travels across the sequence of record storage positions, each shift register is synchronously shifted so that the contents of the address being read out on leads 148–1, 148–2, etc. from the output of each shift register corresponds to the record position that is in accessing relation to the playing mechanism at that particular time. The outputs from all of the shift registers SR1 through SR8 are supplied via their respective output leads to an OR gate 150, and the output from the OR gate 150 is combined with the output of a similar OR gate (not shown) associated with the other memory set of addresses 30a by an output OR gate 152. Therefore, when a retrieval command signal, as a logical 1, is received from a shift register storage being interrogated, this signal is provided at the output OR gate 152 and is amplified by a suitable amplifier circuit 154 to provide an actuating signal of sufficient magnitude to operate the control circuits 38 for stopping the carriage at the selected record storage location and causing the playing means to operate through its cycle, retrieving and playing the selected record and returning the record to its storage location in the manner and by means well known to the art. The carriage then continues to move through the sequence of record storage locations, as the distributor resumes its interrogation of the memory until another retrieval command is received.

The control circuits are wired to the carriage drive mechanism so that interrogation of the memory set **30*a* takes place while the carriage is moving in one direction and the interrogation of memory set 30*b* takes place while the carriage moves in the opposite direction, the carraige typically having reciprocal motion in systems commonly employed in such automatic phonographs. Hence, for example, all of the selections calling for the A side of the records are played first, and then all of the selections calling for the B side of the records are played. Various ways of switching the interrogated sub-memory outputs relative to the carriage motion may be employed, such as by gate 153** responsive to microswitches employed at the carraige assembly to register the direction of travel of the carriage, but the particular system employed will depend on the particular carriage and playing mechanism used in any specific phonograph or the like.

Referring again to the memory 30 in the illustrated system, the additional buffer shift register 120 within each of the sub-memories 30a and 30b is provided to receive any selection from the keyboard 12 which would ordinarily go to one of the other eight shift registers but for the fact that that particular shift register was being shifted by the interrogating means 36 at the time the selection was being written into the memory from the position and line decoders 26 and 28. However, after that particular line is shifted to read out all of its stages, the contents of the buffer register is then transferred by suitable logic circuitry to that particular appropriate shift register. The buffer register 120 is then employed to receive any selection signal that would ordinarily go into the next successive shift register being interrogated. Thus, the buffer shift register 120 receives all selection code address information from the decoders through OR gates 160 (only one of which is shown) which are coupled to each stage of the shift register, and the stored retrieval signals in the buffer are gated back into the stages of the appropriate shift register, as shown, for example, by the circuit connections to the first stage of shift register SR8. An additional one-shot 162 triggered by the internal position counter 136 through a differentiator 164 is employed to enable the transfer at the appropriate time in the operation of the system.

Suitable resetting circuitry is provided for the internal counters 136 and 140 from the line decoder 28, as shown in FIG. 2, and parallel leads are supplied where necessary or desirable to the sub-memory 30a and associated circuitry, as shown. Although the position and line decoders 26 and 28 are illustrated as forming part of each respective memory set 30a and 30b, a single arrangement of decoders may alternatively be provided to perform the decoding operation for both memory sets or sub-memories. On the other hand, although a single interrogating means 36 for interrogating both memories is illustrated, separate circuits of a similar configuration may alternatively be employed for each memory set.

The entire system may be readily implemented with MOS devices, and the shift registers, multivibrators, gates and counters illustrated herein may be of any suitable MOS construction well known, per se, to the art. Each of the submemories may be of identical construction and formed as identical MOS chips. The read-only memory may be of the type that employs selective metalization or of any other suitable type. Alternatively, if desired, it may be selectively "hard wired".

The use of MOS construction results in a very low cost for the large number of functional active components that would be needed with other forms of implementation, such as large scale integration of bipolar devices or the use of discrete semiconductor components.

Although a specific embodiment of the invention has been illustrated and described, various modifications thereof will be apparent to those skilled in the art; accordingly, the scope of the invention should be defined only by the appended claims and equivalents thereof.

Various features of the invention are set forth in the following claims.

What is claimed is:

1. A system for selectively retrieving one of a plurality of articles, each being stored in a respective predetermined storage location, said system comprising, information input means for providing a selectable encoded signal corresonding to a given article in a predetermined storage location, buffer storage means responsive to said encoded signal for storing the same, a shift register memory having storage addresses corresponding to the respective predetermined storage locations of said articles, gating means responsive to the encoded signal in said buffer storage means for writing a retrieval command signal into said memory at an address corresponding to said encoded signal, retrieval means sequentially positionable in relative accessing relation to said predetermined storage locations to retrieve a selected article therewithin, means for providing a timing signal in synchronism with said retrieval means being positioned in accessing relation to each storage location in sequence, interrogating means responsive to said timing signal for synchronously interrogating the storage addresses of said shift register memory in a sequence corresponding to the sequential positioning of said retrieval means relative to the storage locations of said articles, and control means responsive to the output of said memory as the addresses thereof are being sequentially interrogated for causing said retrieval means to retrieve said given article in response to the occurrence of said retrieval command signal at said output.

2. The system of claim 1 wherein said memory comprises a plurality of shift registers.

3. The system of claim 1 wherein said buffer storage means comprises a static memory for storing the encoded signal corresponding to the given article selected.

4. The system of claim 3 wherein said information input means includes a keyboard and means for providing the encoded signals as binary representations corresponding to the actuated keys of the keyboard, and said static memory of the buffer storage means includes first means for storing the binary representation signal corresponding to each actuated key, second means for storing the binary representation signals stored in said first means, and means for transferring each binary representation signal from said first means to said second means upon each key actuation.

5. The system of claim 1 wherein said information input means includes means for providing a further signal indicative of the selection of a predetermined portion of said given article for retrieval, said memory comprising a plurality of sets of said storage addresses, the number of said sets corresponding to the number of predetermined portions of the respective articles, and gating means responsive to said further signal for causing said writing means to write said retrieval command signal into a predetermined one of said sets of storage addresses at an address therewithin corresponding to said encoded signal.

6. The system of claim 1 wherein at least one storage location is not to be accessed by said retrieval means, said system comprising a further memory for storing information identifying a storage location not to be accessed and providing an encoded signal corresonding thereto, means for comparing the encoded signal from said further memory with the encoded signals from said input information means to provide a disable signal when the latter encoded signal corresponds to the former, and gating means responsive to said disable signal to prevent a retrieval command signal from being written into said memory at an address corresponding to the encoded signal in said buffer storage means.

7. The system of claim 1 wherein said memory has a metal-oxide-semiconductor construction.

8. The system of claim 5 wherein said sets of storage addresses comprise like chips having metal-oxide-semiconductor construction.

9. The system of claim 8 wherein each metal-oxide-semconductor storage chip comprises a plurality of shift registers for storing said retrieval command signal at addresses corresponding to said selectable encoded signals.

10. The system of claim 2 wherein the selection of a given article is generated by a two digit code and said information input means includes a keyboard, said system comprising means responsive to the first digit of said code to define a particular shift register address of said memory and means responsive to the second digit of said code to define a particular stage address of said particular addressed shift register for writing in of said retrieval command signal.

11. In an automatic phonograph, a selection and memory system for selecting and storing the selection information for each record side to be played, each record being stored in a different predetermined storage location and said phonograph having record playing means sequentially positionable in relative accessing and playing relation to the predetermined storage locations to play the selected record side, said system comprising:

a first set of selection switches for providing a first output signal indicative of a selected record containing the material to be played, a second set of selection switches for providing a second output signal indicative of a given side of said selected record containing the material to be played, a memory for storing said first output signal upon switch actuation within said first set of selection switches, two further memories, each having storage addresses corresponding to the respective predetermined storage locations of the records and each being associated with the two respective sides of the records, gating means responsive to the signal in said memory and to said second output signal for writing a command signal into one of the two further memories depending on the side indication of said second output signal and at a storage address corresponding to said first output signal, means for generating a timing signal in synchronism with said record playing means being positioned in playing relation to each storage location in sequence, interrogating means responsive to said timing signal for interrogating the storage addresses of said further memories in a sequence corresponding to the sequential positioning of said record playing means relative to the record storage locations to read out the information contained within said further memories, and control means responsive to the outputs of said further memories as the addresses thereof are sequentially read out for causing said record playing means to play said given side of said selected record in response to the occurrence of said command signal.

12. In the phonograph of claim 11 wherein said record playing means moves reciprocally relative to said record storage locations, said system comprising means for interrogating one of said further memories while said playing means is moving in one direction and the other of said further memories while said playing means is moving in the other direction.

13. The system of claim 11 wherein said further memories have a metal-oxide-semiconductor construction.

14. A system for selectively retrieving one of a plurality of articles, each being stored in a respective predetermined storage location, said system comprising, information input means for providing a selectable encoded signal, including first and second information codes, corresponding to a given article in a predetermined storage location, a memory comprising a plurality of shift registers, each having a plurality of stages, and defining shift register line and stage position storage addresses of the memory corresponding to respective predetermined storage locations of said articles, means responsive to the encoded signal for writing a retrieval command signal into said memory at a shift register line and stage position address corresponding to said first and second information codes of said encoded signal, retrieval means sequentially positionable in relative accessing relation to said predetermined storage locations to retrieve a selected article therewithin, means for providing a timing signal in synchronism with said retrieval means being positioned in accessing relation to each storage location in sequence, interrogating means responsive to said timing signal for synchronously shifting the shift registers of said memory to read out the shift register line and stage position addresses thereof in a sequence corresponding to the sequential positioning of said retrieval means relative to the storage locations of said articles, and control means responsive to the output of the shift registers of said memory as said addresses are being sequentially interrogated for causing said retrieval means to retrieve said given article in response to the occurrence of said retrieval command signal at said output.

* * * * *